United States Patent
Ye et al.

(10) Patent No.: US 9,148,511 B2
(45) Date of Patent: Sep. 29, 2015

(54) METHODS AND SYSTEMS FOR ASSESSING THE EFFICIENCY OF CALL CENTER OPERATIONS

(71) Applicant: Xerox Corporation, Norwalk, CT (US)

(72) Inventors: Han Ye, Chapel Hill, NC (US); Shi Zhao, Palatine, IL (US)

(73) Assignee: Xerox Corporation, Norwalk, CT (US)

(*) Notice: Subject to any disclaimer, the term of this patent is extended or adjusted under 35 U.S.C. 154(b) by 243 days.

(21) Appl. No.: 13/771,557

(22) Filed: Feb. 20, 2013

(65) Prior Publication Data

US 2014/0233720 A1 Aug. 21, 2014

(51) Int. Cl.
*H04M 3/00* (2006.01)
*H04M 5/00* (2006.01)
*H04M 3/51* (2006.01)

(52) U.S. Cl.
CPC ........ *H04M 3/5175* (2013.01); *H04M 2201/18* (2013.01)

(58) Field of Classification Search
USPC ........ 379/265.01–265.14, 266.01–266.1, 309
See application file for complete search history.

(56) References Cited

U.S. PATENT DOCUMENTS

| | | | |
|---|---|---|---|
| 6,603,854 B1 | 8/2003 | Judkins et al. | |
| 6,748,072 B1 | 6/2004 | McGraw et al. | |
| 7,203,655 B2 | 4/2007 | Herbert et al. | |
| 7,720,214 B2* | 5/2010 | Ricketts | 379/265.02 |
| 7,720,706 B2 | 5/2010 | Herbert et al. | |
| 8,150,021 B2 | 4/2012 | Geva et al. | |
| 8,175,253 B2 | 5/2012 | Knott et al. | |
| 8,565,410 B2* | 10/2013 | Chishti et al. | 379/265.11 |
| 8,787,552 B1 | 7/2014 | Zhao et al. | |
| 2004/0013248 A1 | 1/2004 | Ciavolino | |
| 2006/0256952 A1 | 11/2006 | Rogers et al. | |
| 2012/0051536 A1 | 3/2012 | Chishti et al. | |
| 2013/0251138 A1* | 9/2013 | Spottiswoode et al. | 379/265.12 |
| 2014/0192970 A1* | 7/2014 | Castellani et al. | 379/265.06 |
| 2014/0211933 A1* | 7/2014 | Vymenets et al. | 379/265.06 |

* cited by examiner

*Primary Examiner* — William Deane, Jr.
(74) *Attorney, Agent, or Firm* — Fox Rothschild LLP

(57) ABSTRACT

A method of managing a call center that includes a plurality of agents may include receiving functional data associated with the plurality of call center agents over a time period, for each data curve, normalizing the data points to create a plurality of normalized functional data points, determining a variation associated with each normalized functional data point, determining one or more threshold values associated with each normalized functional data point, determining whether one or more of the normalized functional data points have a value that exceeds the associated threshold value, and identifying each of the normalized functional data points having a value that exceeds the associated threshold value as an outlier. The method may include identifying the call center agent associated with each curve that has an outlier and presenting information pertaining to one or more identified call center agents to a user.

16 Claims, 5 Drawing Sheets

METHODS AND SYSTEMS FOR ASSESSING THE EFFICIENCY OF CALL CENTER OPERATIONS

BACKGROUND

Unusual patterns, such as for example, unusually high call rate bursts in a call center, have not been thoroughly analyzed from an analytical perspective. Outlier detection may be used to identify unusual behavior in data, but it lacks the ability to address inherent relationships within the data such as, for example, time series data.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of managing a call center that includes a plurality of agents may include receiving, by a computing device, functional data associated with the plurality of call center agents over a time period. The functional data may include a plurality of data curves, each data curve may be associated with one of the call center agents, and each data curve may include a plurality of data points pertaining to calls handled by the associated agent during the time period. The method may include, for each data curve, normalizing, by the computing device, the data points to create a plurality of normalized functional data points, determining a variation associated with each normalized functional data point, determining one or more threshold values associated with each normalized functional data point, determining, by the computing device, whether one or more of the normalized functional data points have a value that exceeds the associated threshold value, and identifying each of the normalized functional data points having a value that exceeds the associated threshold value as an outlier. The method may include identifying the call center agent associated with each curve that has an outlier and presenting information pertaining to one or more identified call center agents to a user.

In an embodiment, a system of managing a call center may include a computing device and a computer-readable storage medium in communication with the computing device. The computer-readable storage medium may include one or more programming instructions that, when executed, cause the computing device to receive functional data associated with a plurality of call center agents over a time period. The functional data may include a plurality of data curves, each data curve may be associated with one of the call center agents, and each data curve may include a plurality of data points pertaining to calls handled by the associated agent during the time period. The computer-readable storage medium may include one or more programming instructions that, when executed, cause the computing device to, for each data curve, normalize the data points to create a plurality of normalized functional data points, determine a variation associated with each normalized functional data point, determine whether one or more of the normalized functional data points have a value that exceeds the associated threshold value, and identify each of the normalized functional data points having a value that exceeds the associated threshold value as an outlier. The computer-readable storage medium may include one or more programming instructions that, when executed, cause the computing device to identify the call center agent associated with each curve that has an outlier and present information pertaining to one or more identified call center agents to a user.

DETAILED DESCRIPTION

Figure 1:
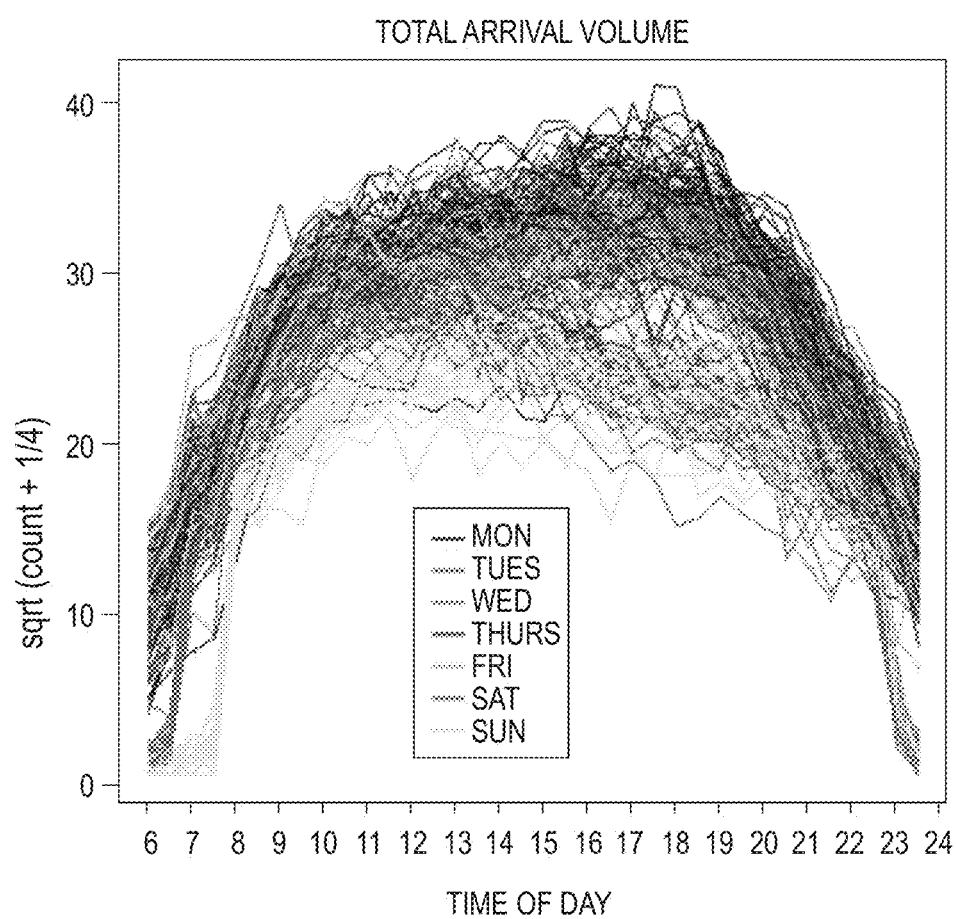
FIG. 1 illustrates an example total call center data over a period of time according to an embodiment.

The following terms shall have, for purposes of this application, the respective meanings set forth below:

An "agent" refers to a person who performs a service to which at least a portion of functional data pertains. For example, in a call center environment, an agent may be a call agent who handles, places and/or receives calls.

A "call center" may be a service center that handles inbound and/or outbound calls. For example, a call center may take customer orders, provide customer service, provide troubleshooting assistance and/or the like.

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

"Functional data" refers to repeated measurements taken as a function of a variable, such as, for example, time. Time series data is an example of functional data according to an embodiment.

A call center may be a location used for the purpose of receiving or placing telephone calls. Call center agents may work to place and/or respond to telephone calls. In an embodiment, an inbound call center may be operated by or on behalf of a company, organization, entity and/or the like to receive calls, such as those from consumers, customers and/or the like. For example, a company may operate a call center to receive technical support telephone calls from consumers. As another example, a company may operate a call center to receive product information or other informational inquiries from customers. Additional and/or alternate types of call centers may be used within the scope of this disclosure.

In an embodiment, information relating to calls handled by agents of a call center may be used to evaluate the agents' performances, anomalies in the information that may pertain to the agents' performance and/or the like. For example, the time spent by one or more agents to handle one or more calls may be evaluated to analyze agent performance, which may in turn be used to analyze a call center's efficiency, productivity and/or the like. Outliers or anomalies in this data may indicate that an agent handled a call or calls too quickly or too slowly. Flagging these outliers may help alert a user, such as a call center manager or operator, to performance issues associated with one or more agents. The user may use this information to follow-up with certain agents regarding their behavior. For example, a user may be able to identify call center agents that need additional training.

In an embodiment, identifying one or more unusual patterns in functional data may allow operational problems to be identified and solved for operational efficiency or performance improvement.

In an embodiment, functional data may include data pertaining to the operation of a call center. A call center may be a service center that handles inbound and/or outbound calls. For example, a call center may take customer orders, provide customer service, provide troubleshooting assistance and/or the like.

In an embodiment, functional data may include information pertaining to agent-released calls. An agent-released call may refer to a call made to a call center that is ended by a call center agent. In an embodiment, a high agent-released call rate may be an indication of abnormal agent behavior. Although this disclosure discusses embodiments relating to call center applications, it is understood that this disclosure extends to other contexts such as, for example, analyzing transportation data, marketing data, business data and/or the like.

Figure 2:
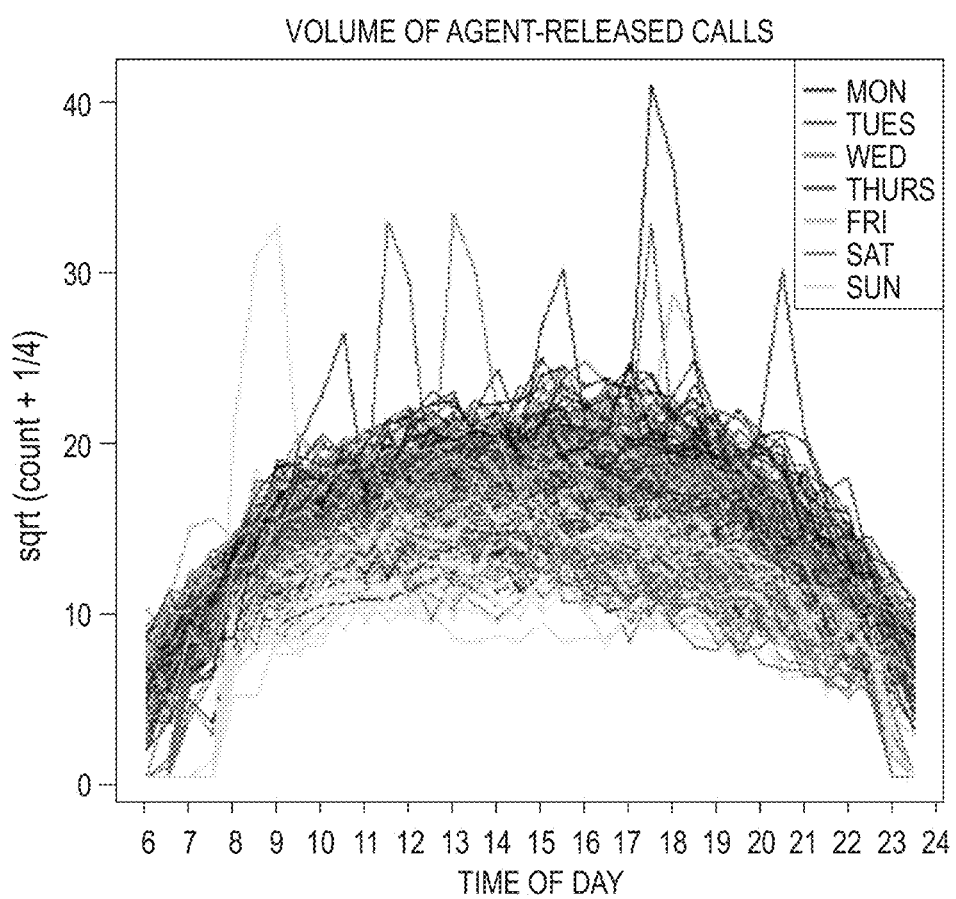
FIG. 2 illustrates example call center data comprising a volume of agent-released calls according to an embodiment.
Figure 3:
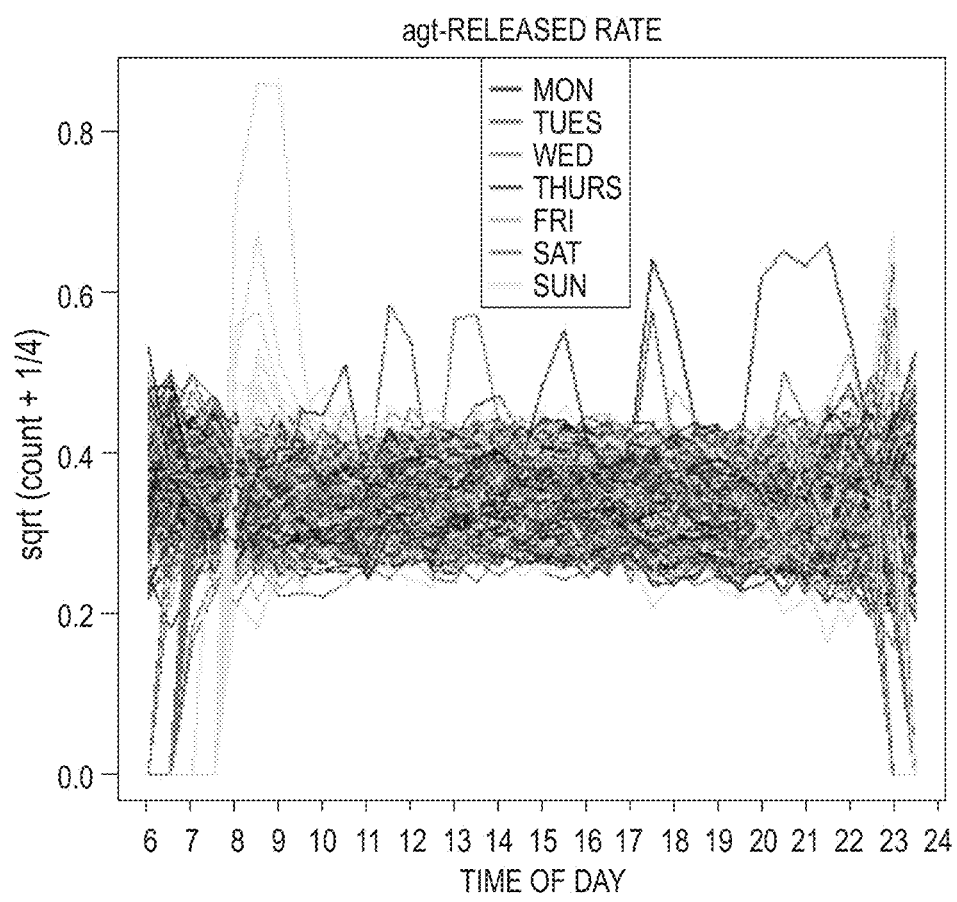
FIG. 3 illustrates example call center data comprising a ratio of agent-released calls to all calls according to an embodiment.

In an embodiment, functional data may be depicted as a series of data points, such as a curve, on a graph. For example, FIG. 1 illustrates example total call center data over a period of time, FIG. 2 illustrates example call center data comprising a volume of agent-released calls, and FIG. 3 illustrates example call center data comprising a ratio of agent-released calls to all calls. Each data curve in FIGS. 1-3 may correspond to an agent. For example, a single data curve in FIG. 1 may illustrate the total call center data associated with a particular agent over a period of time.

In an embodiment, functional data may be associated with a plurality of agents and may include data over a time period. Functional data may include one or more data curves. Each data curve may be associated with a particular agent. In an embodiment, a data curve may include one or more data points pertaining to a measurement. For example, a data curve may include one or more data points pertaining to calls handled by a particular agent.

FIGS. 1-3 illustrate several spikes which may represent an outlier, which may be indicative of unusual agent behavior according to an embodiment. For example, one or more spikes may indicate that one or more agents hang up more call than usual in a call center environment. Correctly identifying spikes may help call center managers, operators or others better assess the behavior of agents, which may help improve the performance and efficiency of call centers.

Figure 4:
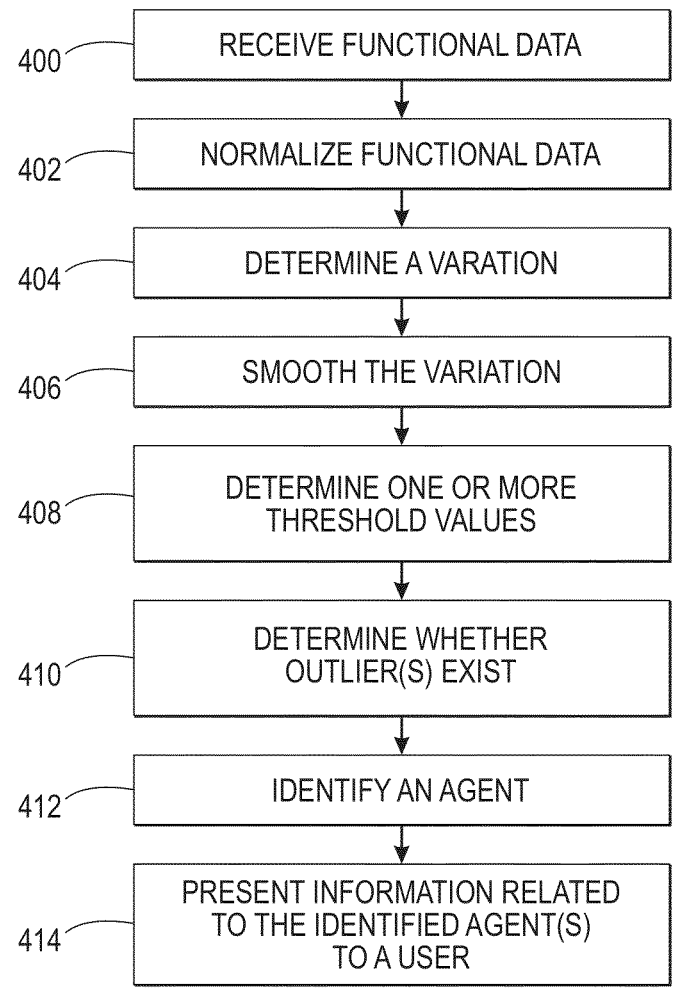
FIG. 4 illustrates an example method of detecting unusual functional data, such as, for example, call center data according to an embodiment.

FIG. 4 illustrates an example method of detecting unusual functional data, such as, for example, call center data according to an embodiment. As illustrated by FIG. 4, functional data may be received 400. In an embodiment, functional data may include call center data. Call center data may include information pertaining to inbound calls received by a call center outbound calls placed by a call center, or other calls handled by a call center over a period of time. Such information may include, without limitation, a time associated with a call, a call agent who handled the call and/or the like.

In an embodiment, functional data may be received from a computing device. For example, a system or subsystem may monitor and track call center data pertaining to one or more call centers. At least a portion of this call center data may be received 400 from the system or subsystem.

In an embodiment, received functional data may be represented as follows:

$$X=(x_{ij})=(x_1^T, x_2^T, \ldots, x_I^T)^T, \text{ where}$$

$x_{ij}$ denotes the $j^{th}$ observed value on the $i^{th}$ data curve
i=1, 2, ..., I
j=1, 2, ..., J
T denotes a matrix transpose operation.

In an embodiment, one or more data points in the functional data may be normalized 402 to generate normalized functional data. In an embodiment, functional data may be normalized 402 by determining an average data curve associated with the data curves. The average data curve may embody a pattern that is common to all data curves. In an embodiment, the average data curve may be removed from the functional data.

In an embodiment, one or more data points in the functional data may be normalized 402 using Robust Component Analysis (RPCA). By way of illustration, and referring to the above example:

$x_0=(x_{01}, x_{02}, \ldots, x_{0J})$ may denote the robust center of the received functional data $p_k=(p_{k1}, p_{k2}, \ldots p_{kJ})$ may denote the $k^{th}$ Robust Principal Component (RPC), where k=1, 2, ..., I'

$t_{ik}$ may denote the robust score of the kth RPC and the ith curve, i=1, 2, ..., I, k=1, 2, ..., I'

In an embodiment, an RPC may be removed from each data curve. The normalized functional data may be represented by the following with respect to the above example:

$$\tilde{x}_i=(\tilde{x}_{i1}, \tilde{x}_{i2}, \ldots, \tilde{x}_{iJ})=x_i-x_0-t_{i1}*p_1, i=1, 2, \ldots, I$$

In an embodiment, a variation between the normalized functional data may be determined 404 for one or more data points in the normalized functional data. For example, in an embodiment, a robust standard deviation of the normalized functional data may be determined. A robust standard deviation, $\sigma_j$, may be represented by the following:

$$\sigma_j = \frac{\text{Median}(\{|\tilde{x}_{ij}|: i=1, 2, \ldots, I\})}{0.6745}, j=1, 2, \ldots, J$$

In an embodiment, the robust standard deviation may be smoothed 406. The robust standard deviation may be smoothed 406 to account for dependencies that may exist amongst the functional data. For example, data points that are proximally close to one another may have dependencies on one another that do not exist between data points that are located further from one another in the functional data.

In an embodiment, a robust standard deviation may be smoothed 406 using polynomial regression. Referring to the above example, local polynomial regression of $(\sigma_1, \sigma_2, \ldots, \sigma_J)$ may be fit on $(1, 2, \ldots, J)$ and the estimates may be denoted by $(\hat{\sigma}_1, \hat{\sigma}_2, \ldots, \hat{\sigma}_J)$.

In an embodiment, one or more threshold values may be determined 408. The threshold values may be based on the smoothed robust standard deviation according to an embodiment. The determined thresholds may indicate a range outside of which data may be considered an outlier. For example, an upper threshold and a lower threshold value may be determined 408. Data having a value that exceeds the upper threshold and/or data having a value that is below the lower threshold may be considered an outlier. As another example, a single threshold value may be determined 408. In an embodiment, data having a value that exceeds the threshold may be identified 408 as an outlier. In an alternate embodiment, data having a value that falls below the threshold may be identified 408 as an outlier.

In an embodiment, a threshold value may be a certain multiplier of the robust standard deviation value. For example, a threshold value may be equal to four times the robust standard deviation value. Referring to the above example, a threshold value may be represented by $(4\hat{\sigma}_1, 4\hat{\sigma}_2, \ldots, 4\hat{\sigma}_J)$.

In an embodiment, it may be determined 410 whether one or more outliers exist. An outlier may be a value that is not within a threshold range, a value that exceeds a threshold value and/or a value that falls below a threshold value. Referring to the above example, identifying an outlier value may be represented by the following:

$$S = s_{ij} = I(|\tilde{x}_{ij}| < 4\hat{\sigma}_j),$$

i=1, 2, ..., I
j=1, 2, ..., J where I(.) represents a true/false indicator

As such, S may represent the resulting matrix of the outlier value detection procedure where $s_{ij}=1$ may indicate the occurrence of an outlier value on the $j^{th}$ observation of the $i^{th}$ curve, and $s_{ij}=0$ may indicate no occurrence of an outlier value on the $j^{th}$ observation of the $i^{th}$ curve.

In an embodiment, if it is determined 410 that one or more outliers exist, an agent associated with a curve having one or more detected outlier values may be identified 412. In an embodiment, information relating to the identified agent, functional data associated with the identified agent, and/or the like may be presented 414 to a user. This information may be displayed on a display device to a user, emailed to a user, and/or otherwise sent to a user.

In an embodiment, a user may be able to take corrective action with respect to one or more identified agents. For example, a user may follow-up with an identified agent to obtain more information about the agent's outlier value or values. As another example, a user may determine that one or more of the identified agents needs training. In an embodiment, a user may add a notation to an employment or other file of one or more identified agents.

Figure 5:
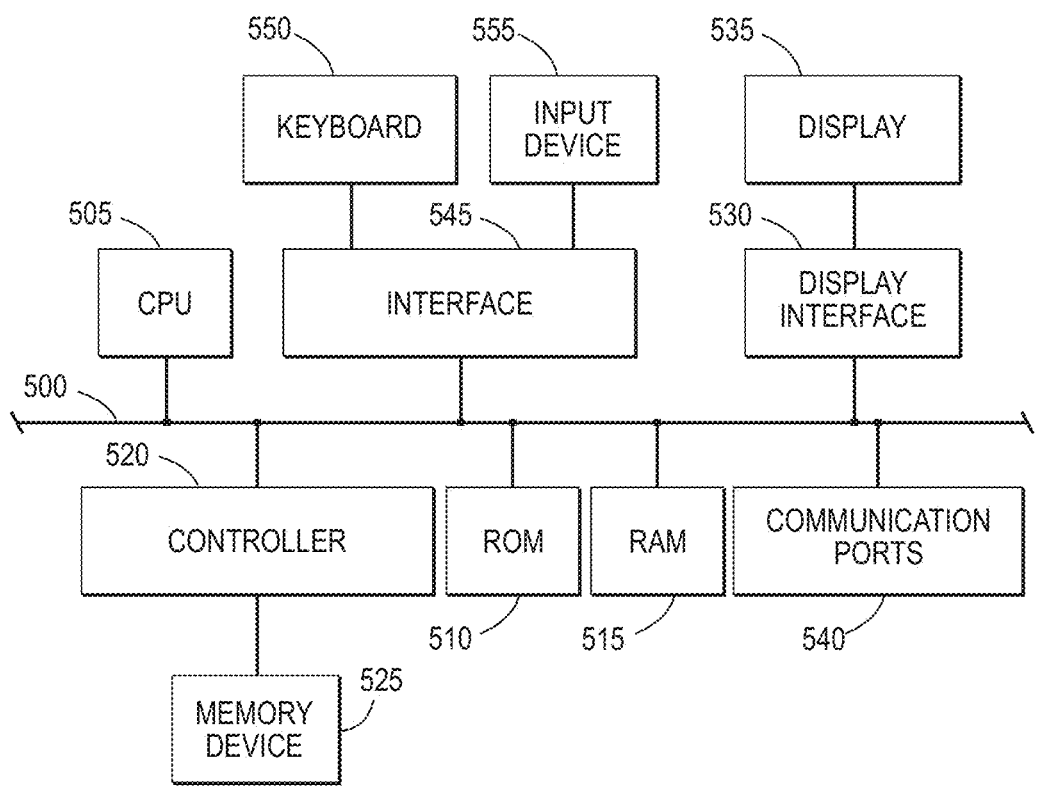
FIG. 5 is a block diagram depicting example elements that may be present in an electronic device or a computing device.

FIG. 5 depicts a block diagram of internal hardware that may be used to contain or implement the various services and processing devices as discussed above. A bus 500 serves as the main information highway interconnecting the other illustrated components of the hardware. CPU 505 is a processor, the central processing unit of the system that performs calculations and logic operations required to execute a program. CPU 505, alone or in conjunction with one or more of the other elements disclosed in FIG. 5, is a processing device, computing device or processor as such terms are used within this disclosure. Read only memory (ROM) 510 and random access memory (RAM) 515 constitute exemplary memory devices.

A controller 520 provides an interface between with one or more optional tangible, non-transitory computer-readable memory devices 525 and the system bus 500. These memory devices 525 may include, for example, an external or internal DVD or CD ROM drive, a hard drive, flash memory, a USB drive or the like. As indicated previously, these various drives and controllers are optional devices. Additionally, the memory devices 525 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any the methods and systems as discussed above may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 530 may permit information from the bus 500 to be displayed on the display 535 in audio, visual, graphic or alphanumeric format. The information may include information related to a current job ticket and associated tasks. Communication with external devices may occur using various communication ports 540. An exemplary communication port 540 may be attached to a communications network, such as the Internet or an local area network.

The hardware may also include an interface 545 which allows for receipt of data from input devices such as a keyboard 550 or other input device 555 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A method of assessing a call center's efficiency, wherein the call center comprises a plurality of agents, the method comprising:
   receiving, by a computing device, for one or more of the agents, functional data associated with the agent over a time period, wherein the functional data comprises data pertaining to one or more agent-released calls ended by the associated agent during the time period;
   for each agent for whom functional data was received:
      normalizing, by the computing device, the associated functional data to create normalized functional data, and
      determining, by the computing device, a variation associated with the agent-released call;
      determining, by the computing device, one or more threshold values associated with the agent-released call,
      determining, by the computing device, whether the agent-released call has a value that exceeds the associated threshold value, and
      in response to determining that the agent-released call has a value that exceeds the associated threshold value, identifying, by the computing device, the agent-released call as an outlier and identifying the agent as unproductive; and
   presenting information pertaining to one or more identified unproductive agents to a user.

2. The method of claim 1, wherein normalizing the functional data comprises:
   identifying an average data curve associated with the functional data; and
   removing the average data curve from the functional data.

3. The method of claim 1, wherein normalizing the functional data comprises:
   performing Robust Component Analysis on the functional data to identify a Robust Principle Component; and
   removing the Robust Principle Component from the functional data.

4. The method of claim 1, wherein determining a variation associated with each agent-released call comprises determining a robust standard deviation for each agent-released call in the normalized functional data.

5. The method of claim 4, wherein a threshold value is a multiplier of the robust standard deviation.

6. The method of claim 1, further comprising smoothing the variation using polynomial regression.

7. The method of claim 1, wherein a threshold value is a multiplier of the variation.

8. The method of claim 1, wherein presenting information pertaining to one or more identified unproductive agents to a user comprises one or more of the following:
   displaying at least a portion of the information on a display device; and
   emailing at least a portion of the information to a user.

9. A system of assessing a call center's efficiency, the system comprising:
   a computing device; and
   a non-transitory computer-readable storage medium in communication with the computing device, wherein the computer-readable storage medium comprises one or more programming instructions that, when executed, cause the computing device to:
      receive, for one or more agents of the call center, functional data associated with the agent over a time period, wherein the functional data comprises data pertaining to one or more agent-released calls ended by the associated agent during the time period,
      for each agent for whom functional data was received:
         normalize the associated functional data to create normalized functional data, and
         for each agent-released call in the normalized functional data:
            determine a variation associated with the agent-released call,
            determine one or more threshold values associated with the agent-released call,
            determine whether the agent-released call has a value that exceeds the associated threshold value, and
            in response to determining that the agent-released call has a value that exceeds the associated threshold value, identify the agent-released call as an outlier, and identify the agent as unproductive, and
         present information pertaining to one or more identified unproductive agents to a user.

10. The system of claim 9, wherein the one or more programming instructions that, when executed, cause the computing device to normalize the functional data comprise one or more programming instructions that, when executed, cause the computing device to:
   identify an average data curve associated with the functional data; and
   remove the average data curve from the functional data.

11. The system of claim 9, wherein the one or more programming instructions that, when executed, cause the computing device to normalize the functional data comprise one or more programming instructions that, when executed, cause the computing device to:
   perform Robust Component Analysis on the functional data to identify a Robust Principle Component; and
   remove the Robust Principle Component from the functional data.

12. The system of claim 9, wherein the one or more programming instructions that, when executed, cause the computing device to determine a variation associated with each agent-released call comprises one or more programming instructions that, when executed, cause the computing device to determine a robust standard deviation for each agent-released call in the normalized functional data.

13. The system of claim 12, wherein a threshold value is a multiplier of the robust standard deviation.

14. The system of claim 9, wherein the computer-readable storage medium further comprises one or more programming instructions that, when executed, cause the computing device to smooth the variation using polynomial regression.

15. The system of claim 9, wherein a threshold value is a multiplier of the variation.

16. The system of claim 9, wherein the one or more programming instructions that, when executed, cause the computing device to present information pertaining to one or more identified unproductive agents to a user comprises one or more programming instructions that, when executed, cause the computing device to perform one or more of the following:
   display at least a portion of the information on a display device; and
   email at least a portion of the information to a user.

* * * * *